(12) United States Patent
He et al.

(10) Patent No.: US 8,973,770 B2
(45) Date of Patent: Mar. 10, 2015

(54) COVER FOR PRESSURE COOKER WITH LOCKING PIECES

(71) Applicants: Zhigang He, Foshan (CN); Zhibin Huang, Foshan (CN)

(72) Inventors: Zhigang He, Foshan (CN); Zhibin Huang, Foshan (CN)

( * ) Notice: Subject to any disclaimer, the term of this patent is extended or adjusted under 35 U.S.C. 154(b) by 0 days.

(21) Appl. No.: 14/308,730

(22) Filed: Jun. 19, 2014

(65) Prior Publication Data

US 2014/0299597 A1    Oct. 9, 2014

Related U.S. Application Data

(63) Continuation-in-part of application No. 13/825,967, filed as application No. PCT/CN2010/078628 on Nov. 11, 2010, now abandoned.

(51) Int. Cl.
*A47J 27/08* (2006.01)
*B65D 45/16* (2006.01)

(52) U.S. Cl.
CPC ............. *A47J 27/0804* (2013.01); *B65D 45/16* (2013.01)
USPC ................ 220/203.2; 220/573.1; 220/326; 220/324; 220/212.5

(58) Field of Classification Search
CPC ....... A47J 27/0804; A47J 27/08; A47J 36/10; A47J 36/06; F16K 31/18; F16K 24/042; B65D 45/16
USPC ......... 220/203.2, 203.22, 203.19, 573.1, 912, 220/326, 324, 315, 318, 212.5, 212; D7/358, 354

See application file for complete search history.

(56) References Cited

U.S. PATENT DOCUMENTS

| | | | | |
|---|---|---|---|---|
| 1,362,878 | A * | 12/1920 | Ladd ............................ | 220/4.03 |
| 1,508,817 | A * | 9/1924 | Phaehler et al. ......... | 220/203.04 |
| 1,519,766 | A * | 12/1924 | Demuth .................... | 220/203.29 |
| 1,799,905 | A * | 4/1931 | Jacobs .......................... | 220/263 |
| 2,565,964 | A * | 8/1951 | Graham et al. .......... | 220/203.07 |
| D258,038 | S * | 1/1981 | Johnson ........................ | D7/358 |
| D263,270 | S * | 3/1982 | Pauty ............................ | D7/358 |
| 6,450,361 | B1 * | 9/2002 | Mendelson et al. ....... | 220/573.1 |

FOREIGN PATENT DOCUMENTS

| | | | | |
|---|---|---|---|---|
| DE | 742103 | C * | 12/1944 | ......... A47J 27/0804 |
| GB | 485444 | A * | 5/1938 | ......... A47J 27/0804 |

* cited by examiner

*Primary Examiner* — Robert J Hicks
(74) *Attorney, Agent, or Firm* — CBM Patent Consulting, LLC

(57) ABSTRACT

A pressure cooker cover comprises a cover (1) and a float valve (2), wherein a seal ring (7) is installed in the inner edge of the cover while hooks (8) are installed in the two side edges of the cover. A push-pull device (9) which can move the hooks back and forth is mounted in the ends of the hooks. The push-pull device comprises a rotating base (9-1) arranged in the middle portion of the cover, a rotating shaft (9-2) and a locking piece (9-3) which is coupled with the rotating shaft (9-2). Sliding chutes (9-31) are provided at the two sides of the locking piece. Guide columns (8-1) which are slidingly matched with the sliding chutes are set at two ends of the hooks (8).

4 Claims, 4 Drawing Sheets

COVER FOR PRESSURE COOKER WITH LOCKING PIECES

This application is a continuation-in-part application of U.S. patent application Ser. No. 13/825,967 filed Mar. 25, 2013, which is the U.S. national phase of International Application No. PCT/CN2010/078628 Filed 11 Nov. 2010 which designated the U.S. and claims priority to Chinese Application Nos. 201020547421.3 filed 28 Sep. 2010, the entire contents of each of which are hereby incorporated by reference.

TECHNICAL FIELD

The invention relates to the technical field of pressure cooker, particularly to a pressure cooker cover.

BACKGROUND ART

With the continuous improvement of people's living standard, pressure cooker gains increasing popularity among people for its convenient use, environmental protection and energy saving. In respect of the structure, it mainly comprises a shell, a cooker cover and a cooker body, wherein a float valve, a pressure relief valve and a safety valve are provided on the cooker cover; when the pressure in the cooker body rises to a certain level, the high pressure will prop up the float of the float valve to prevent the rotary opening of the cooker cover. It has a simple structure and is easy to use. The disadvantage of the structure is that the float can move up under external force whether the pressure in the cooker body is sufficient or whether the cooker cover is open, thus causing trouble to users.

DISCLOSURE OF THE INVENTION

Technical Problems

The purpose of the invention is to provide a pressure cooker cover featured by simple and reasonable structure, reliable safety performance and convenient use, so as to solve the existing technical deficiencies.

Technical Solution

This invention adopts the following technical solution to achieve said purpose: A pressure cooker cover, comprising a cover and a float valve, wherein a seal ring is installed at the inner edge of the cover, characterized in that hooks are installed at the two side edges of the cover, and a push-pull device which can move the hooks back and forth is installed at the ends of the hooks.

Furthermore, said push-pull device comprises a rotating base installed in the middle portion of the cover, a rotating shaft and a locking piece coupled with the rotating shaft. Sliding chutes are provided on the two sides of the locking piece, and the sliding chutes slidably match the guide columns of the sliding bars respectively.

The end of said hooks extends inward to become a sliding bar, the two sliding bars of the hook are installed on the two sides of the rotating shaft respectively, a guiding chute is provided on the sliding bar and slidably matches the guide column installed correspondingly on the upper part of the cooker cover; the hooks are installed along the edge of the cooker cover, the end of the hooks is arc-shaped, and a supporting bar installed at the end of the sliding bar is connected to the hook.

The sliding chutes on the two sides of said locking piece are inclined, and an angle is formed between the sliding chute and the sliding bar at the end of the hook.

The side edge of said locking piece is provided with an opening, which allows the passing of the float of the float valve.

Said locking piece is Z-shaped, and the opening, which allows the passing of the float of the float valve, is installed at the horizontal end of the Z-shaped locking piece.

Beneficial Effects

The invention adopting the said technical solution can achieve the following beneficial effects:

In this invention, hooks are installed at the two side edges of the cover, and a push-pull device which can move the hooks back and forth is installed at the ends of the hooks. When the rotating base is rotated, the hooks can be driven to move for engagement or disengagement of cooker cover; meanwhile, the upward or downward movement of the float enables locking or unlocking of the push-pull device, so as to ensure that the cooker cover can not be opened when there is pressure in the cooker and the users can use the cooker cover safely and conveniently.

DESCRIPTION OF NUMBER DESIGNATIONS IN THE ACCOMPANYING DRAWINGS 1 indicates a cooker cover; 1-1 indicates a Guide column of sliding bar; 2 indicates a Float valve; 3 is a cooker body; 4 is an Upper base; 5 is an Insulation cover; 6 is a Middle ring; 7 is a Seal ring; 8 is a Hook; 9 is a Push-pull device; 9-1 is a Rotating base; 9-2 is a Rotating shaft; 9-3 is a Locking piece; 9-31 is a sliding chute; 9-32 is an Opening; 9-4 is a Sliding bar; 9-41 is a guide column; 9-42 is a guide chute and 9-43 is a supporting bar.

DETAILED DESCRIPTION OF THE PREFERRED EMBODIMENTS

Figure 1:
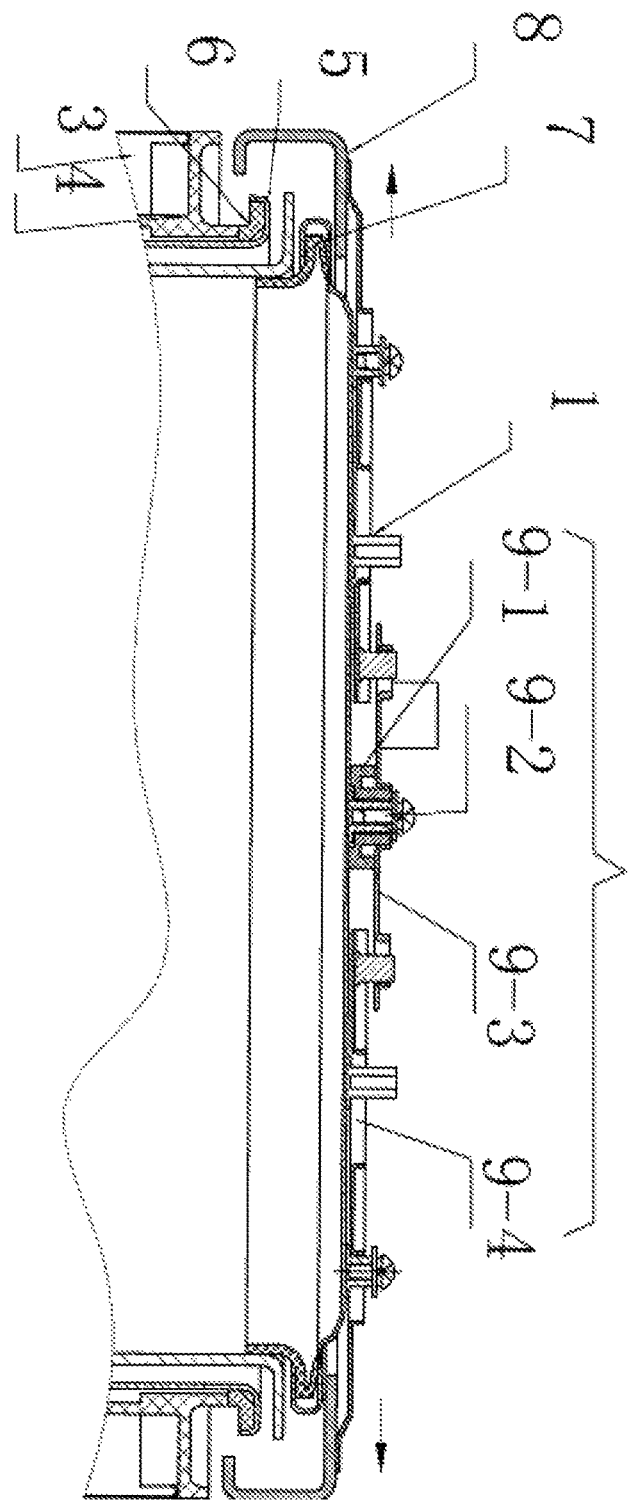
FIG. 1 is a schematic view of the unlocked cooker cover according to the invention.
Figure 2:
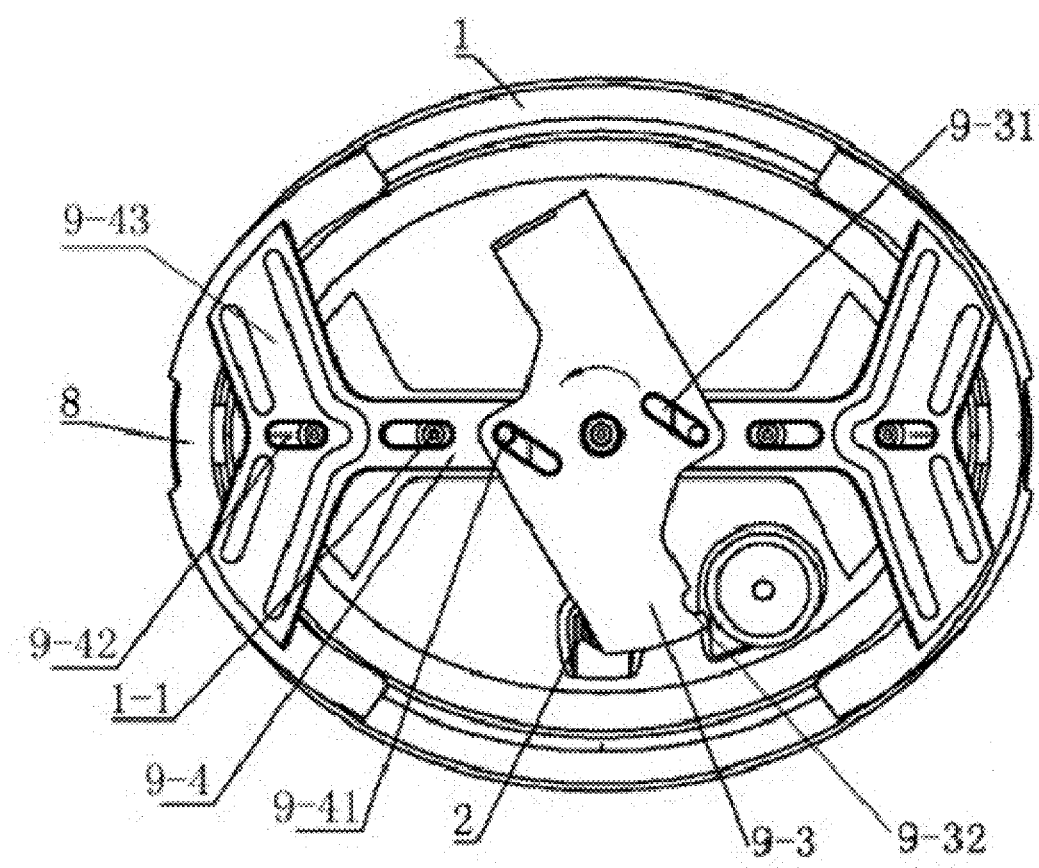
FIG. 2 is a top view of FIG. 1.
Figure 3:
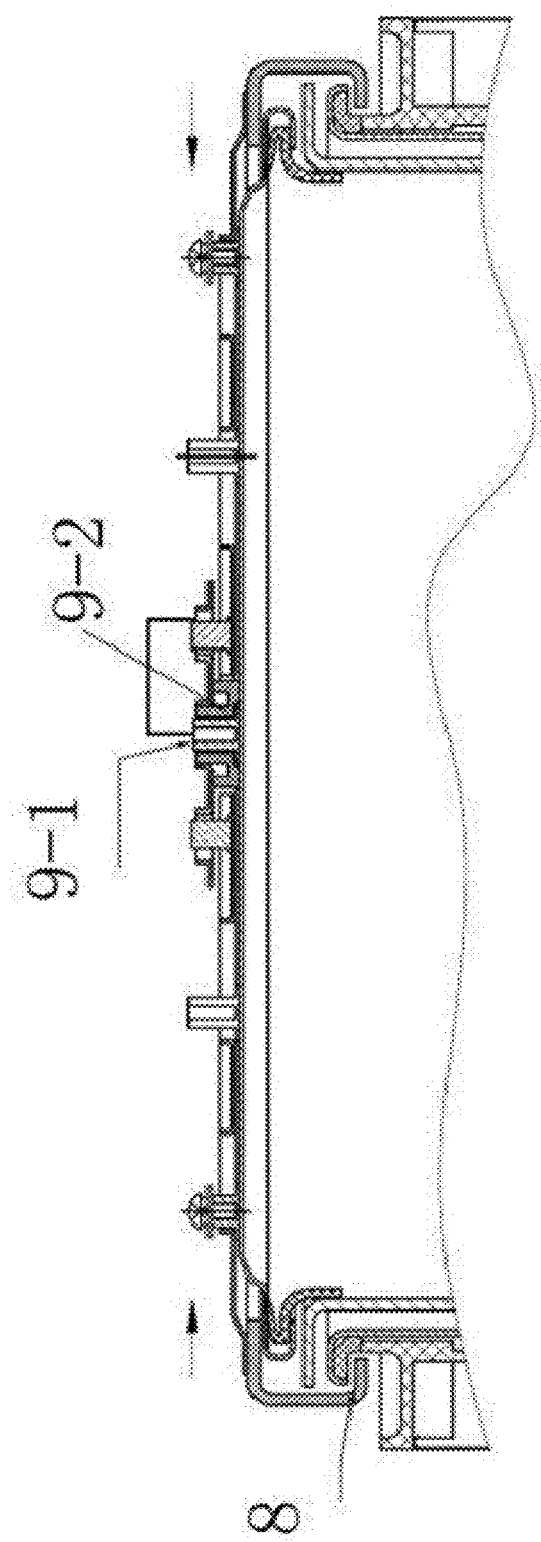
FIG. 3 is a schematic view of the locked cooker cover according to the invention.
Figure 4:
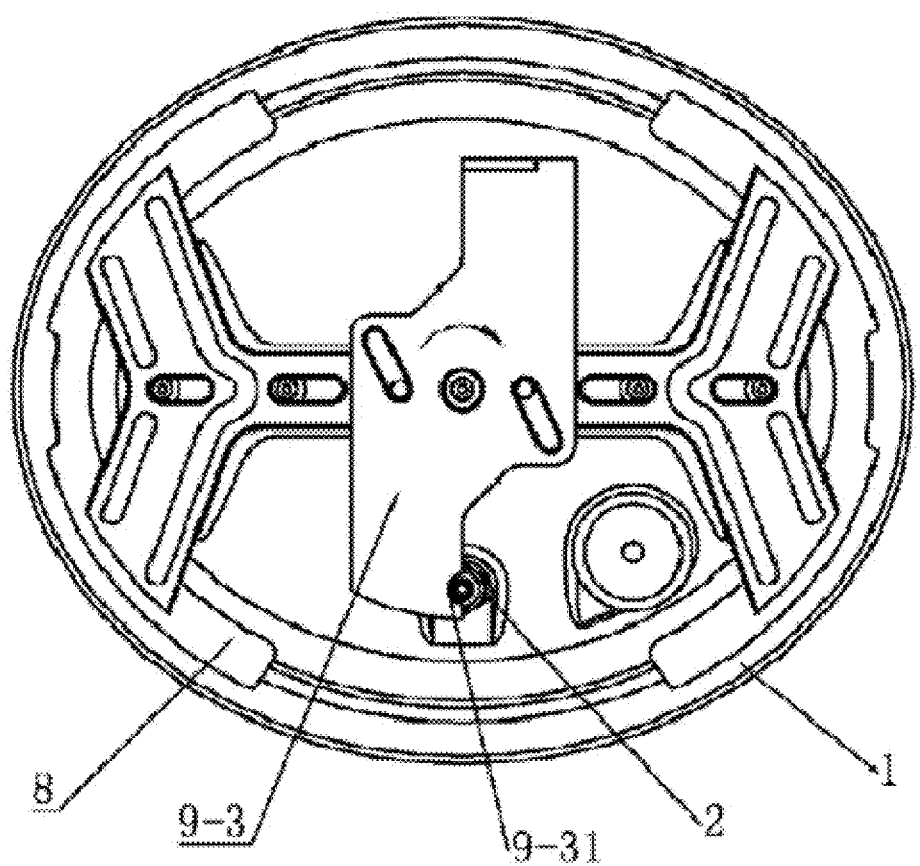
FIG. 4 is a top view of FIG. 3.

As illustrated in FIGS. 1-4, a pressure cooker cover, comprising a cover 1, a float valve 2, a seal ring 7, hooks 8 and a push-pull device 9.

The said float valve 2 is installed at the inner edge of the cover 1 and can penetrate through the cover 1 from the top to bottom of the cover 1. The seal ring 7 is set at the inner edge of the cover 1. There are two hooks 8, which are symmetrically installed at the edge of the cover 1, the two hooks are arranged at 180 degree from each other around the edge of the circumference of the cover. The said push-pull device 9 comprises a rotating base 9-1, a rotating shaft 9-2, a locking piece 9-3 and two sliding bars 9-4. The rotating base 9-1 is installed in the center of the cover 1, the rotating shaft 9-2 is installed on the rotating base 9-1, the locking piece 9-3 is coupled with the rotating shaft 9-2; each one end of two sliding bars 9-4 is respectively connected with the locking piece 9-3, each another end of two sliding bars 9-4 is connected with the hooks 8, respectively. Two sliding chutes 9-31 are provided on the locking piece 9-3, each sliding chute 9-31 connects a sliding bar 9-4, which is installed with guide column 9-41 corresponding to relevant sliding chute 9-31. The guide column 9-41 is installed at the end of each sliding bar.

Each sliding bar 9-4 is set with a guide chute 9-42 installed with a slider guide column 1-1 on the cover 1. Each hook 8 is installed along the edge of the cover 1, the hook is arc-shaped, and a supporting bar 9-43 is installed at the end of the sliding bar 9-4 which is connected to the hook 8.

An angle is formed between the sliding chute 9-31 and the sliding bar 9-4. The locking piece 9-3 is provided with an opening 9-32, which enables the passing of the float of the float valve 2, and the opening 9-32 is installed at the end of the locking piece 9-3.

In this implementation example, the said locking piece 9-3 is Z-shaped, and the opening 9-32 is installed at the horizontal end of the Z-shaped locking piece.

During use, rotate the rotating base clockwise, then the locking piece drives the guide columns of the locking piece on the hooks to move the hooks horizontally, so as to detach the hooks from the insulation cover and the middle ring and unlock the cooker cover; on the contrary, the cooker cover can be locked when the rotating base is rotated counterclockwise.

Said embodiment is only a preferred embodiment of this utility model, and it should be noted that certain modifications and improvements can be made by those of ordinary skill in the art without departing from the creative concept of this utility model, which also fall within the scope of protection of this utility model.

What is claimed is:

1. A pressure cooker cover, comprising a cover, a float valve, a seal ring, two hooks and a push-pull device;
    said float valve is installed at the cover and penetrates through a top surface of the cover;
    said seal ring is set at an inner edge of the cover;
    the two hooks are installed symmetrically at an outer edge of the cover;
    said push-pull device comprises a rotating base, a rotating shaft, a locking piece and two sliding bars, the rotating base is installed in the middle portion of the cover, the rotating shaft is installed on the rotating base, the locking piece is coupled with the rotating shaft; each one end of the two sliding bars are respectively connected with the locking piece, each another end of the two sliding bars are connected the two hooks, respectively.

2. The pressure cooker cover of claim 1, characterized in that two sliding chutes are provided on the locking piece, each sliding chute connects each sliding bar which is installed with a guide column; the guide column is installed at the end of each sliding bar nearest the hook.

3. The pressure cooker cover of claim 1, characterized in that each sliding bar is set with a guide chute installed with a slider guide column on the cover.

4. The pressure cooker cover of claim 1, characterized in that the hooks are installed along the outer edge of the cover, the hooks are arc-shaped, and a supporting bar is installed with the sliding bar connected to the hook.

* * * * *